J. S. DUNLAP.
COFFEE PERCOLATOR.
APPLICATION FILED JAN. 20, 1919.
1,306,415.
Patented June 10, 1919.
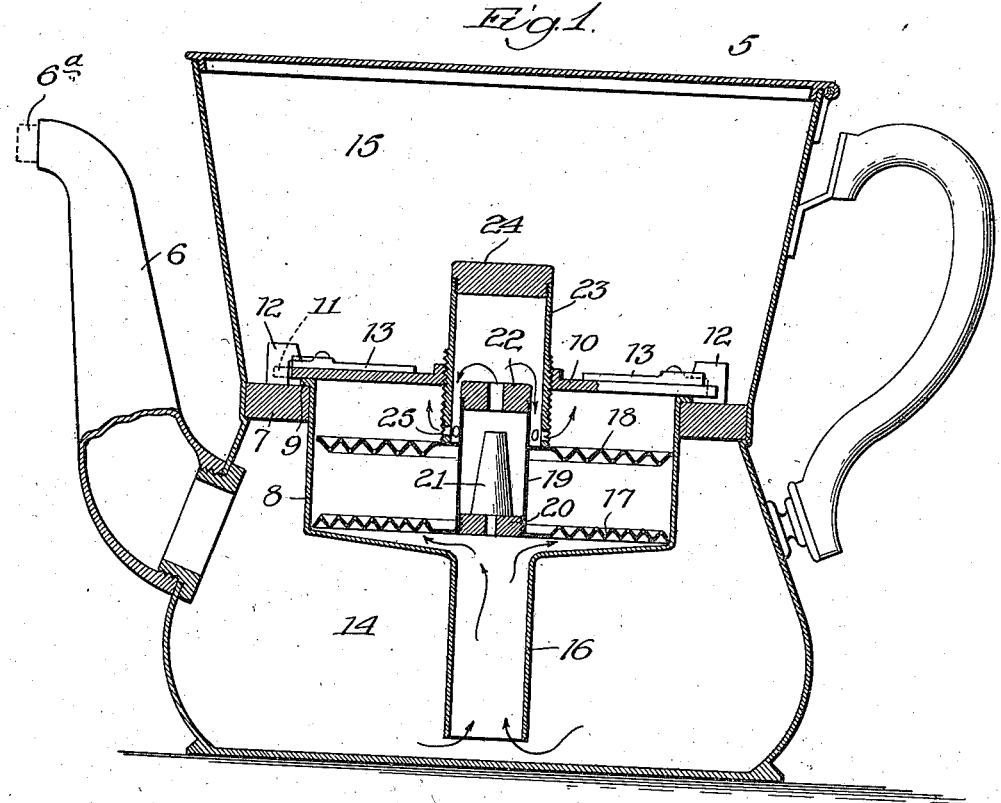
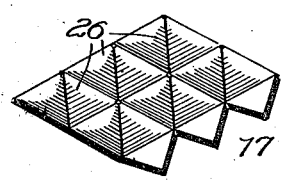
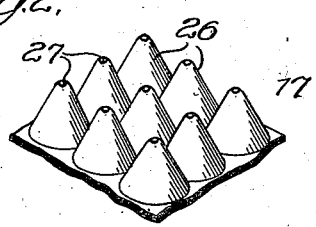
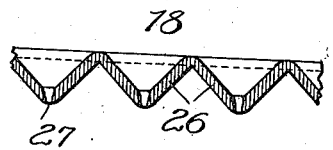
Inventor
John S. Dunlap

UNITED STATES PATENT OFFICE.

JOHN S. DUNLAP, OF CHICAGO, ILLINOIS.

COFFEE-PERCOLATOR.

1,306,415.  Specification of Letters Patent.  Patented June 10, 1919.

Application filed January 20, 1919. Serial No. 272,147.

*To all whom it may concern:*

Be it known that I, JOHN S. DUNLAP, a citizen of the United States, residing at Chicago, in the county of Cook and State of Illinois, have invented a new and useful Improvement in Coffee-Percolators, of which the following is a specification.

My invention relates to an improvement in percolators of the class employed in making infusions of coffee and other material in more or less finely-ground condition.

In the use of percolators of the present type, as the liquid passes through the ground mass, as of coffee, for which I have more especially designed my improvement, it sometimes carries with it small particles thereof, which clog the perforations in the percolator and thus reduce the number or size of openings for the passage of the fluid, with the effect of preventing a greater or less amount of the coffee from being brought into contact with the infusion-liquid and that of causing waste. When, on the other hand, these openings are of sufficient size to avoid clogging, particles of the coffee wash through them, thereby diminishing the resistance to the passage of the fluid through the ground percolator-mass at the points where it is reduced by the particles thus eliminated from it, so that the liquid will escape contact with other portions of the mass and waste will ensue. Moreover, the presence of coffee-particles in the infusion is objectionable.

The primary object of my invention is to provide a construction of percolator whereby the objections thus stated, and other objections, shall be overcome, by compelling the liquid to contact with the coffee throughout the entire mass thereof in the percolator.

While my improved percolator is not intended to be limited for use to any particular infusion-making apparatus or utensil in the class referred to, having more immediately devised it for improving the operation of the coffee-pot of my United States Letters Patent No. 871,492, dated November 19, 1907, it is illustrated in that connection in the accompanying drawing, in which—

Figure 1 is a broken view in vertical section and partly in elevation of a coffee-pot containing my improved percolator; Fig. 2 is a broken perspective view of one of the percolator-disks; Fig. 3 is an enlarged broken sectional view showing the pair of percolator-disks in their opposing operative relation, and Fig. 4 is a view like that presented by Fig. 2, but illustrating a modification.

The coffee-pot 5, which may be of any desired form including that illustrated, has a tight-fitting cover; and the spout 6, in using the coffee-pot for percolating, should be plugged with a suitable removable stopper, indicated at 6ª, in its outer end to confine the pressure generated in the pot for forcing the liquid employed upwardly through the percolator hereinafter described. In the pot, about midway between its top and bottom, is provided the inwardly-extending seating ring 7.

The improved percolator, as shown, is in the form of a cup 8 having an outwardly-extending flange 9 about its edge for seating the cup on the ring 7, in which position it is releasably confined by a bar 10 having end-notches 11 to embrace diametrically-opposite shouldered lugs 12, 12 rising from the ring, the bar, which is clearly illustrated in my aforesaid patent, carrying cam-levers 13, 13 near its ends to coöperate with the lug-shoulders and releasably but tightly fasten the cup upon its seat to thus divide the interior of the coffee-pot into a lower chamber 14 and an upper chamber 15 communicating with each other only through the percolator when in its operative position. Centrally from the bottom of the cup depends a tube 16, to reach nearly to the bottom of the pot, and upwardly through which the water used, and which partially fills the chamber 14, is forced by the pressure generated in the latter when it becomes sufficiently high by heating the contents.

My invention lies principally in the construction of the foraminous disk, plate, or diaphragm member of my improved percolator. The lower member 17 seats in the bottom of the cup and is fastened to and surrounds the lower end of an upright tube 19, in which is secured a perforated button 20 seating a valve-forming weight 21, shown of frusto-conical form, and which should be composed, like the disks, of non-corroding metal, such as German silver. The upper end of the tube 19 is closed by a vented plug or stopper 22. The upper member 18 is at the lower end of a tube 23 to surround the tube 19 when the parts of the percolator are assembled into coöperative relation; and this tube, the upper end of which is closed by a stopper 24 and which is provided with perforations 25 about its lower end just above the disk 18, is externally threaded to screw into a threaded central opening in the clamping-bar 10.

The improvement in the foraminous percolator-members lies in so designing them as to cause them to uniformly distribute the liquid throughout the mass of ground coffee confined between them in the cup, and avoid the objections hereinbefore referred to. To that end each plate, formed preferably of suitable stamped sheet-metal, has substantially its entire surface composed of hollow tapering projections 26, of the preferred conical form illustrated in Fig. 2, or pyramidal, as illustrated in Fig. 4, or of any other suitable shape, and provided with liquid-passages 27, preferably in the apexes, and toward which they taper. These plates are so placed relatively to each other in the cup that the apexes of the projections alinedly face each other in contact with the mass of coffee between them.

With the percolator in place in the pot and supplied with ground coffee, and with water in the chamber 14 and heat being applied, with the spout 6 stoppered, as aforesaid, the resultantly generated pressure in that chamber forces the liquid upwardly through the percolator into the chamber 15. In passing through the lower member, the projections form guides directed to the flow of the liquid, with which each projection becomes filled under the pressure, the areas of the openings being insufficient to permit its direct passage. A small volume of liquid will thus be confined at each opening and must pass through the latter, as distinguished from the more usual flat percolator-disks, in which the liquid, seeking paths of least resistance, passes through their perforations where the coffee-mass is lightest. The liquid having streamed through the numerous openings in the lower member, traverses the mass of coffee and seeks to escape through the openings in the upper member. Any particles of coffee carried by the streams will strike against the apexes and be deflected from the openings therein, it being practically impossible to force the particles, however fine they may be, through the small openings, so that they remain unobstructive to the liquid-flow. Any particles of the coffee entering an opening will be immediately carried through it owing to its diameter gradually increasing from the entrance end, so that no clogging occurs.

The use of my improved percolator-disks permits the coffee to be ground much finer than is usual, without danger of washing through, so that a materially smaller quantity of the coffee will serve to obtain an infusion of the desired strength, with the resultant advantage of economy.

As will be understood, in heating water in the chamber 14, resultant heating of the air confined therein expands it increasingly with the increase of temperature and causes it to act in connection with the generated steam upon the liquid to force it upwardly through the percolator, and thus prevent excessive heating or boiling of the infusion. As the heat of the infusion becomes reduced by shutting off the heat or removing the coffee-pot from the heater, the pressure in the chamber 14 subsides, permitting the infusion to pass from the upper chamber 15 by way of the tube-openings 25 through the disks and interposed coffee and through the tube 16 into the lower chamber 14, from which it may be dispensed through the spout, after removing the stopper from the latter. In fact, the reduced pressure in the lower chamber creates sufficient of a vacuum therein to induce rapidity in the return-flow of the infusion.

Should the resistance offered by the mass of coffee to the passage of water cause undue increase of pressure in the chamber and tend to so increase the temperature as to be injurious to the infusion, the gravity-valve 21 will open under such pressure and a portion of the liquid will rise through tube 19 and enter the upper chamber by way of the openings 25 and cup 8 to relieve the pressure. The valve 21 thus affords means for automatically regulating the temperature and pressure in the lower pot-chamber to prevent overheating and impairment of the infusion.

I realize that considerable variation is possible in the details of construction herein shown and described, and I do not intend by illustrating the present specific or preferred embodiments of my invention to be limited thereto, it being my intention in the following claims to claim protection for all the novelty there may be in my invention as fully as the state of the art will permit.

I claim:—

1. A percolator comprising a cup, and a pair of percolator-members supported in the cup in spaced relation to each other and provided with conical projections on their opposing faces, said projections having inwardly tapered openings in their apexes.

2. A percolator comprising a cup, and a pair of percolator-members supported in the cup in spaced relation to each other, one of said members being provided with conical projections on its face, said projections having inwardly tapering openings in their apexes.

3. A percolator comprising a cup having a spout depending from its bottom, and a pair of percolator-members supported in the cup in spaced relation to each other and provided with conical projections on their opposing faces, said projections having inwardly tapered openings in their apexes, 4. A percolator comprising a cup having a spout depending from its bottom, a pair of percolator-members in spaced relation in the cup, provided on their opposing faces with conical projections having inwardly-tapered openings in their apexes, a tube extending upwardly from the lower member and having a valved opening in its lower end and a vented upper end, and a tube rising from the upper member about the said valved tube, provided with openings adjacent said last-named member and having a closed upper end.

JOHN S. DUNLAP.